US012572935B2

(12) United States Patent
Jones

(10) Patent No.: US 12,572,935 B2
(45) Date of Patent: Mar. 10, 2026

(54) DIGITAL ASSET PAYMENT RAIL

(71) Applicant: The PNC Financial Services Group, Inc., Pittsburgh, PA (US)

(72) Inventor: Bradley N. Jones, Charlotte, NC (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 146 days.

(21) Appl. No.: 18/543,834

(22) Filed: Dec. 18, 2023

(65) Prior Publication Data

US 2025/0200572 A1     Jun. 19, 2025

(51) Int. Cl.
| | |
|---|---|
| *G06Q 20/40* | (2012.01) |
| *G06Q 20/36* | (2012.01) |
| *G06Q 20/38* | (2012.01) |

(52) U.S. Cl.
CPC ......... *G06Q 20/401* (2013.01); *G06Q 20/363* (2013.01); *G06Q 20/389* (2013.01)

(58) Field of Classification Search
None
See application file for complete search history.

(56) References Cited

U.S. PATENT DOCUMENTS

| | | | |
|---|---|---|---|
| 10,673,619 B1 | 6/2020 | Shi | |
| 10,938,862 B1 | 3/2021 | Panicker | |
| 11,373,187 B1 | 6/2022 | Cash | |
| 11,637,693 B2 * | 4/2023 | Prokopenya | G06Q 20/4016 |
| | | | 380/28 |

| | | | |
|---|---|---|---|
| 11,769,154 B1 | 9/2023 | Cash | |
| 11,907,955 B2 * | 2/2024 | Fang | G06Q 40/02 |
| 2016/0092988 A1 | 3/2016 | Letourneau | |
| 2016/0330027 A1 | 11/2016 | Ebrahimi | |
| 2017/0011460 A1 * | 1/2017 | Molinari | H04L 9/3247 |
| 2017/0053249 A1 | 2/2017 | Tunnell | |
| 2017/0103391 A1 | 4/2017 | Wilson, Jr. | |
| 2017/0154331 A1 | 6/2017 | Voorhees | |
| 2019/0026821 A1 | 1/2019 | Bathen | |
| 2019/0251629 A1 * | 8/2019 | Gordon, III | G06Q 20/3821 |
| 2020/0013048 A1 | 1/2020 | Love | |
| 2020/0133938 A1 | 4/2020 | Yan | |
| 2020/0334668 A1 | 10/2020 | Nicli et al. | |
| 2021/0073913 A1 | 3/2021 | Ingargiola | |
| 2021/0383334 A1 * | 12/2021 | Krasnyansky | G06Q 20/02 |
| 2022/0122062 A1 | 4/2022 | Mayblum | |

FOREIGN PATENT DOCUMENTS

| | | | | |
|---|---|---|---|---|
| JP | 7305906 B2 | 7/2023 | | |
| WO | 2019231951 A1 | 12/2019 | | |
| WO | WO-2021125399 A1 * | 6/2021 | | H04L 67/1097 |

* cited by examiner

*Primary Examiner* — Paul S Schwarzenberg
(74) *Attorney, Agent, or Firm* — K&L Gates LLP

(57) ABSTRACT

A system and method of transferring digital assets is disclosed. The method can comprises effecting a transaction comprising a user authorizing a transfer of a digital asset from a consumer wallet to an account, updating the blockchain ledger of the first digital asset to reflect the transfer, and characterizing the digital asset as compliant or non-compliant based on evaluating the digital asset for suspicious blocks in the blockchain ledger. Compliant digital assets can be exchanged for fiat currency and deposited in the target account. Non-compliant digital assets can be held in a managed wallet of a custody provider.

20 Claims, 4 Drawing Sheets

400

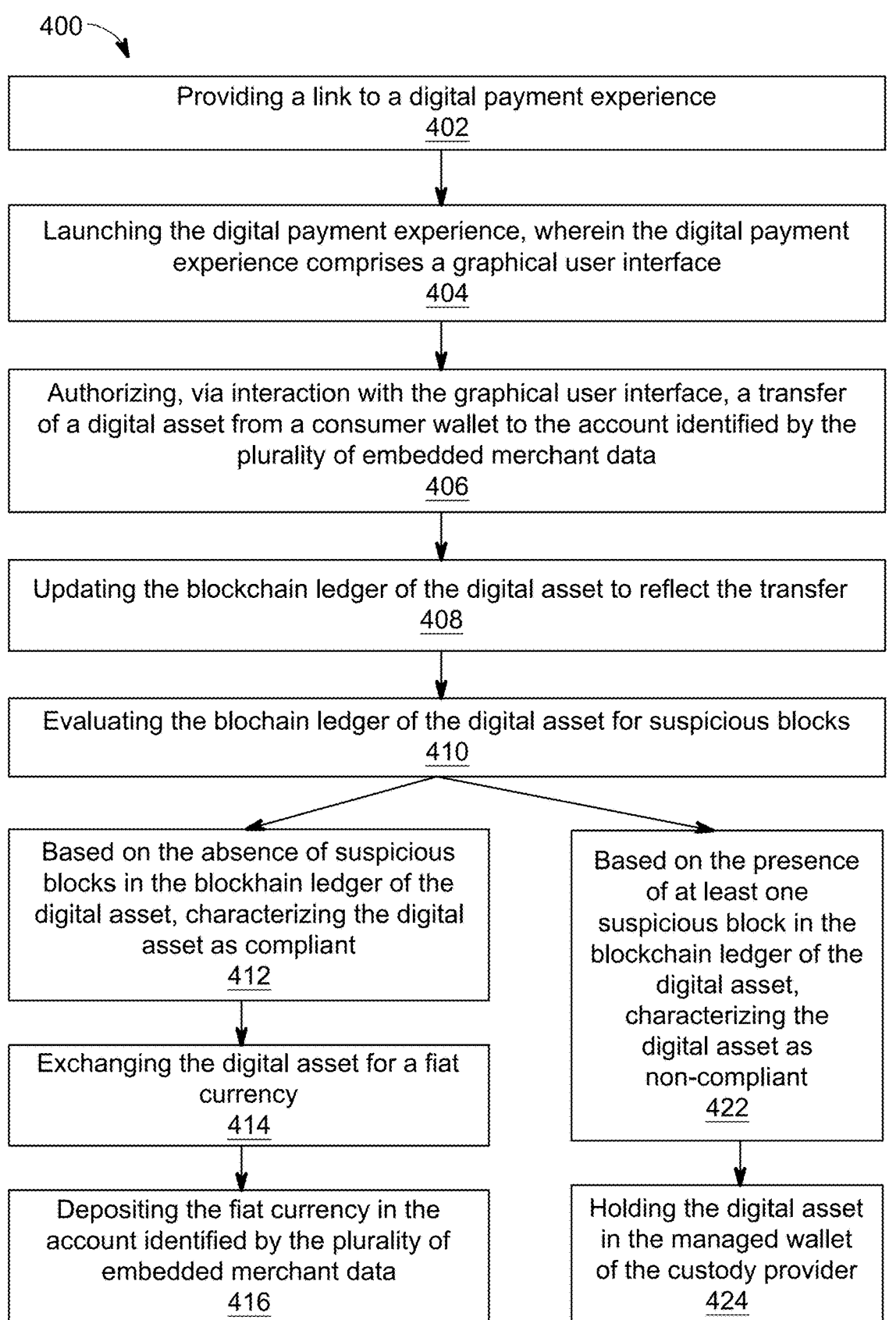

Providing a link to a digital payment experience
402

Launching the digital payment experience, wherein the digital payment experience comprises a graphical user interface
404

Authorizing, via interaction with the graphical user interface, a transfer of a digital asset from a consumer wallet to the account identified by the plurality of embedded merchant data
406

Updating the blockchain ledger of the digital asset to reflect the transfer
408

Evaluating the blochain ledger of the digital asset for suspicious blocks
410

Based on the absence of suspicious blocks in the blockhain ledger of the digital asset, characterizing the digital asset as compliant
412

Based on the presence of at least one suspicious block in the blockchain ledger of the digital asset, characterizing the digital asset as non-compliant
422

Exchanging the digital asset for a fiat currency
414

Depositing the fiat currency in the account identified by the plurality of embedded merchant data
416

Holding the digital asset in the managed wallet of the custody provider
424

FIG. 3

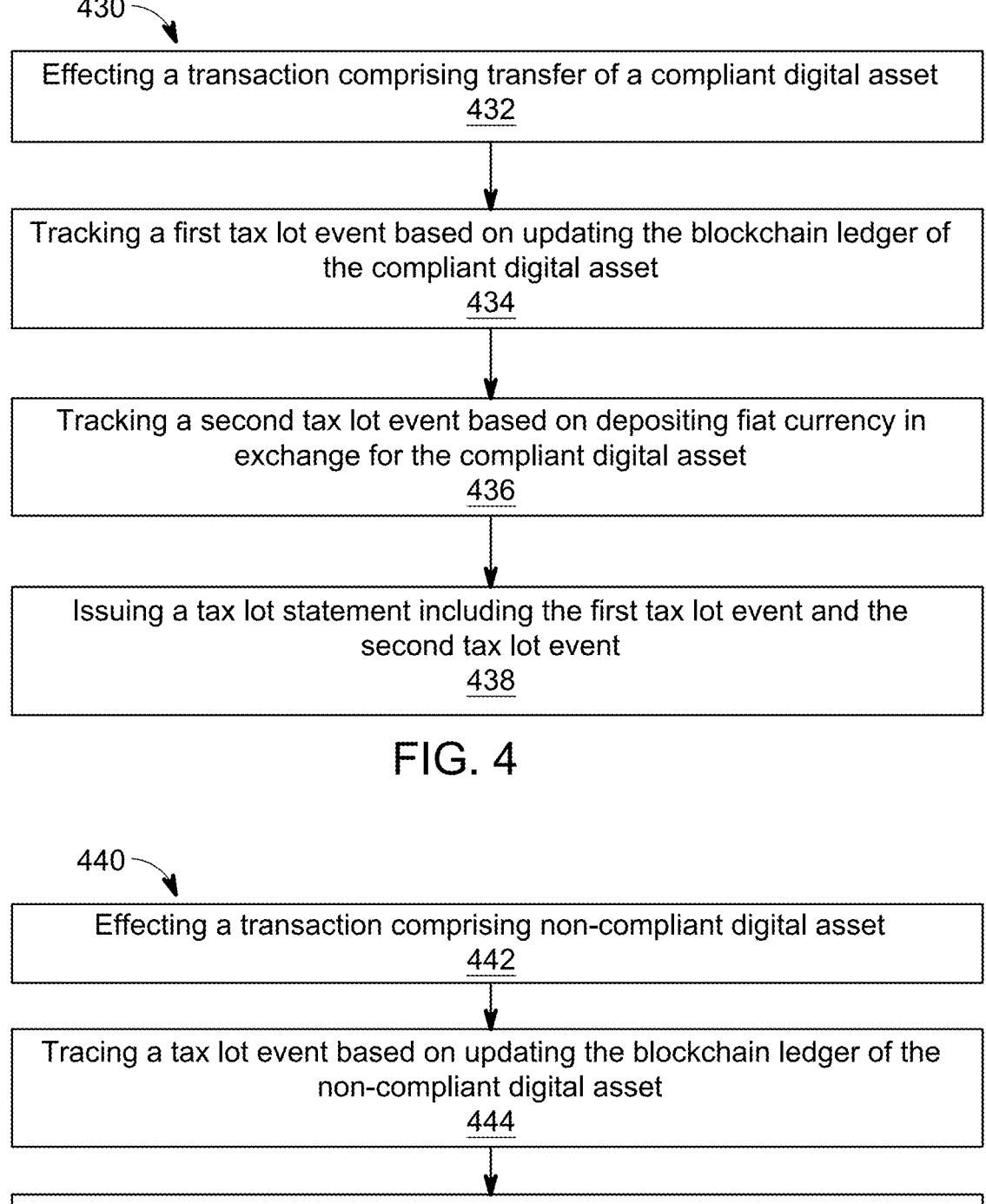

430

Effecting a transaction comprising transfer of a compliant digital asset
432

Tracking a first tax lot event based on updating the blockchain ledger of the compliant digital asset
434

Tracking a second tax lot event based on depositing fiat currency in exchange for the compliant digital asset
436

Issuing a tax lot statement including the first tax lot event and the second tax lot event
438

Effecting a transaction comprising non-compliant digital asset
442

Tracing a tax lot event based on updating the blockchain ledger of the non-compliant digital asset
444

Issue a tax lot statement including the tax lot event
446

FIG. 5

DIGITAL ASSET PAYMENT RAIL

BACKGROUND

Digital assets are based on blockchain technology. There are several types of digital assets, including cryptocurrencies, stablecoins, asset-based tokens, and utility tokens. Cryptocurrencies are a native asset for a blockchain technology. Stablecoins are often linked to a fiat currency and can be public, i.e. a central bank digital currency, or private, i.e. an algorithm-based digital currency. Asset-based tokens include security tokens and non-fungible tokens, for example. Non-fungible tokens can encompass degrees, certificates, forms of identification (e.g. a passport, real ID), for example. Utility tokens provide access to a particular product or service and may be used to raise capital, for example.

SUMMARY

A system and method for transferring digital assets is disclosed. A digital asset payment rail system can include a financial institution, a mobile device, a network of computers, a custody provider, and an exchange provider. The financial institution can provide a link to a digital payment experience and the user, e.g., via a digital device, can launch the digital payment experience to authorize the transaction. In various instances, the financial institution hosts a managed wallet at the custody provider and the custody provider takes custody of the digital asset for compliance and/or facilitating off-ramping of the digital asset to fiat currency. In various instances, the financial institution facilitates the transaction. These and other benefits realizable from embodiments of the present invention will be apparent from the description that follows.

In one aspect, a method of transferring digital assets comprises effecting a first transaction, comprising: providing, by a financial institution, a first link to a first digital payment experience, wherein the first link comprises a plurality of embedded first merchant data, and wherein the plurality of embedded first merchant data identifies one of a plurality of accounts at the financial institution; upon accessing the first link, launching the first digital payment experience, wherein the first digital payment experience comprises a first graphical user interface; authorizing, via interaction with the first graphical user interface, a first transfer of a first digital asset from a first consumer wallet to the account identified by the plurality of embedded first merchant data; upon authorization of the first transfer, updating, by a network of computers, the blockchain ledger of the first digital asset to reflect the first transfer, wherein the first transfer comprises transferring the first digital asset to a managed wallet of a custody provider, and wherein the custody provider secures a private key to the first digital asset; based on the absence of suspicious blocks in the blockchain ledger of the first digital asset, characterizing the first digital asset as compliant; and upon characterizing the first digital asset as compliant, exchanging the first digital asset for a fiat currency and depositing the fiat currency in the account identified by the plurality of embedded first merchant data. The method further comprises effecting a second transaction, comprising: providing, by the financial institution, a second link to a second digital payment experience, wherein the second link comprises a plurality of embedded second merchant data, and wherein the plurality of embedded second merchant data identifies one of the plurality of accounts at the financial institution; upon accessing the second link, launching the second digital payment experience, wherein the second digital payment experience comprises a second graphical user interface; authorizing, via interaction with the second graphical user interface, a second transfer of a second digital asset from a second consumer wallet to the account identified by the plurality of embedded second merchant data; upon authorization of the second transfer, updating, by a network of computers, the blockchain ledger of the second digital asset to reflect the second transfer, wherein the second transfer comprises transferring the second digital asset to the managed wallet of the custody provider, wherein the custody provider secures a private key to the second digital asset; based on the presence of at least one suspicious block in the blockchain ledger of the second digital asset, characterizing the second digital asset as non-compliant; and upon characterizing the second digital asset as non-compliant, holding the second digital asset in the managed wallet of the custody provider.

In one aspect, a digital asset payment rail system for transferring digital assets, comprise: a financial institution comprising a plurality of accounts, a first remote processor, and a memory storing instructions such that the first remote processor, through software stored in the memory, is configured to provide a link to a digital payment experience, wherein the link comprises a plurality of embedded merchant data, and wherein the plurality of embedded merchant data of the link identifies one of the plurality of accounts; a mobile device comprising a graphical user interface, a mobile processor, and a memory storing instructions such that the mobile processor, through software stored in the memory, is configured to: upon activation of the link, launch the digital payment experience on the graphical user interface; and receive authorization from a user of the mobile device via interaction with the graphical user interface to effect transfer of a digital asset from a consumer wallet associated with the user to the account identified by the plurality of embedded merchant data; a network of computers configured to update the blockchain ledger of the digital asset to reflect transfer of the digital asset to a managed wallet based on authorization by the user; a custody provider comprising the managed wallet, a second remote processor, and a memory storing instructions such that the second remote processor, through software stored in the memory, is configured to: secure a private key of the digital asset based on the custody provider obtaining custody of the digital asset; and characterize the digital asset as compliant based on the absence of suspicious blocks in the blockchain ledger of the digital asset; and an exchange provider comprising a third remote processor and a memory storing instructions such that the third remote processor, through software stored in the memory, is configured to, off-ramp the digital asset to a fiat currency and transfer the fiat currency to the account identified by the plurality of embedded merchant data based on the digital asset being characterized as compliant.

BRIEF DESCRIPTION OF THE FIGURES

Various embodiments of the present invention are described herein by way of example in connection with the following figures.

FIG. 3 is a flowchart depicting a digital asset payment rail process, according to various aspects of the present disclosure.

FIG. 4 is a flowchart depicting a tax lot accounting process for a transfer of a compliant digital asset, according to various aspects of the present disclosure.

FIG. 5 is a flowchart depicting a tax lot accounting process for a transfer of a non-compliant digital asset, according to various aspects of the present disclosure.

DETAILED DESCRIPTION

Digital assets are based on blockchain technology. Each digital asset is associated with a blockchain ledger. More specifically, a digital asset is a token on a blockchain ledger. The token represents the amount (e.g. a monetary amount), the party having the right to control it (e.g. the wallet address or public key of the digital asset custodian), and the history of transactions. The wallet address corresponds to a public key and unique identifier for the wallet.

The blockchain ledger is an immutable ledger. The transfer of a digital asset involves updating the blockchain ledger for the digital asset. Blockchain technology relies on a consensus mechanism, or consensus tool, generally comprised of a network of computers to verify the ledger requests are valid and to write on the blockchain ledger associated with the digital asset. The computers in the network can be referred to as nodes. The digital asset is transferred by writing on the blockchain ledger.

In blockchain, the custodian is the entity who controls the private key to a wallet. The private key gives the custodian the right to update the blockchain ledger. Only the entity with the private key of the originating wallet, i.e. the custodian, has the right to request the transaction entry into the blockchain ledger. The consensus mechanism (e.g. a network of computers) verifies the private key is legitimate when a transaction is requested with cryptographically security, Blockchain technology is referred to as "push-only" because the originator pushes the transaction request to the node operators throughout the network. Because blockchain transactions are pushed, the financial institution does not have a way to "accept" or "approve" receive of a digital asset. Rather, the user U askes the consensus mechanism to approve and update the blockchain ledger 254 associated with the digital asset 252 and, upon completion, the transaction is complete.

The network of computers can be a peer-to-peer network of computers, which are used for public blockchains. Alternatively, private blockchains can use a centralized network of computers. In certain instances, the network of computers can be decentralized. In other instances, the network of computers can be centralized.

Figure 1:
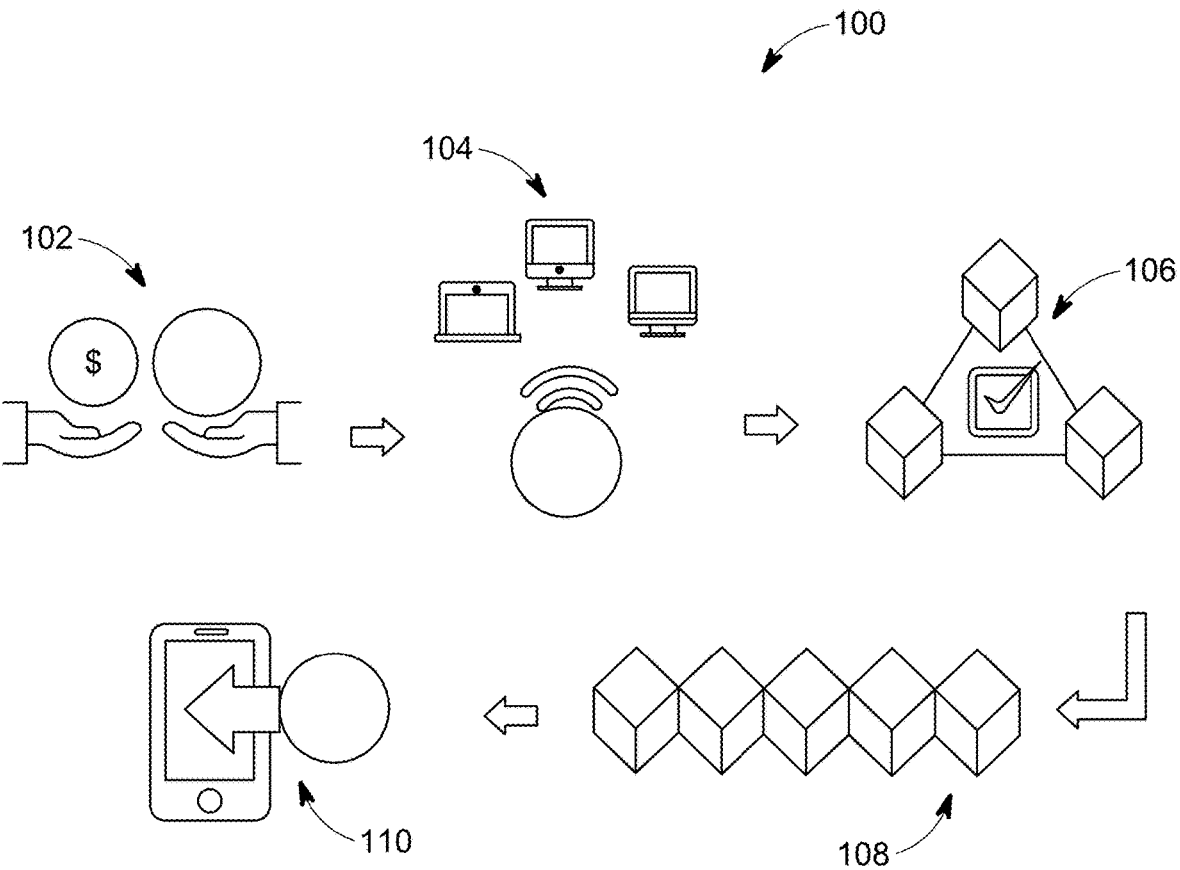
FIG. 1 is a schematic depicting blockchain technology for digital assets, according to various aspects of the present disclosure.

Referring primarily to FIG. 1, a system 100 for effecting an exemplary blockchain transaction is shown. At block 102, a transaction is requested. At block 104, the transaction request is distributed to node operators across the network of computers. At block 106, the node operators validate the transaction using known algorithms. At block 108, upon verification of the transaction, the transaction is combined with other transactions to form a block, and that block is added to an existing blockchain for the digital asset to update the blockchain ledger associated with the digital asset. Thereafter, at block 110, the transaction is complete.

A digital asset payment rail system and method for effecting digital asset transactions by consumers are further disclosed herein. For example, a consumer may want to use a digital asset to make a payment and/or a donation to a business. The payment rail systems and methods disclosed herein can facilitate such transactions, for example.

Figure 2:
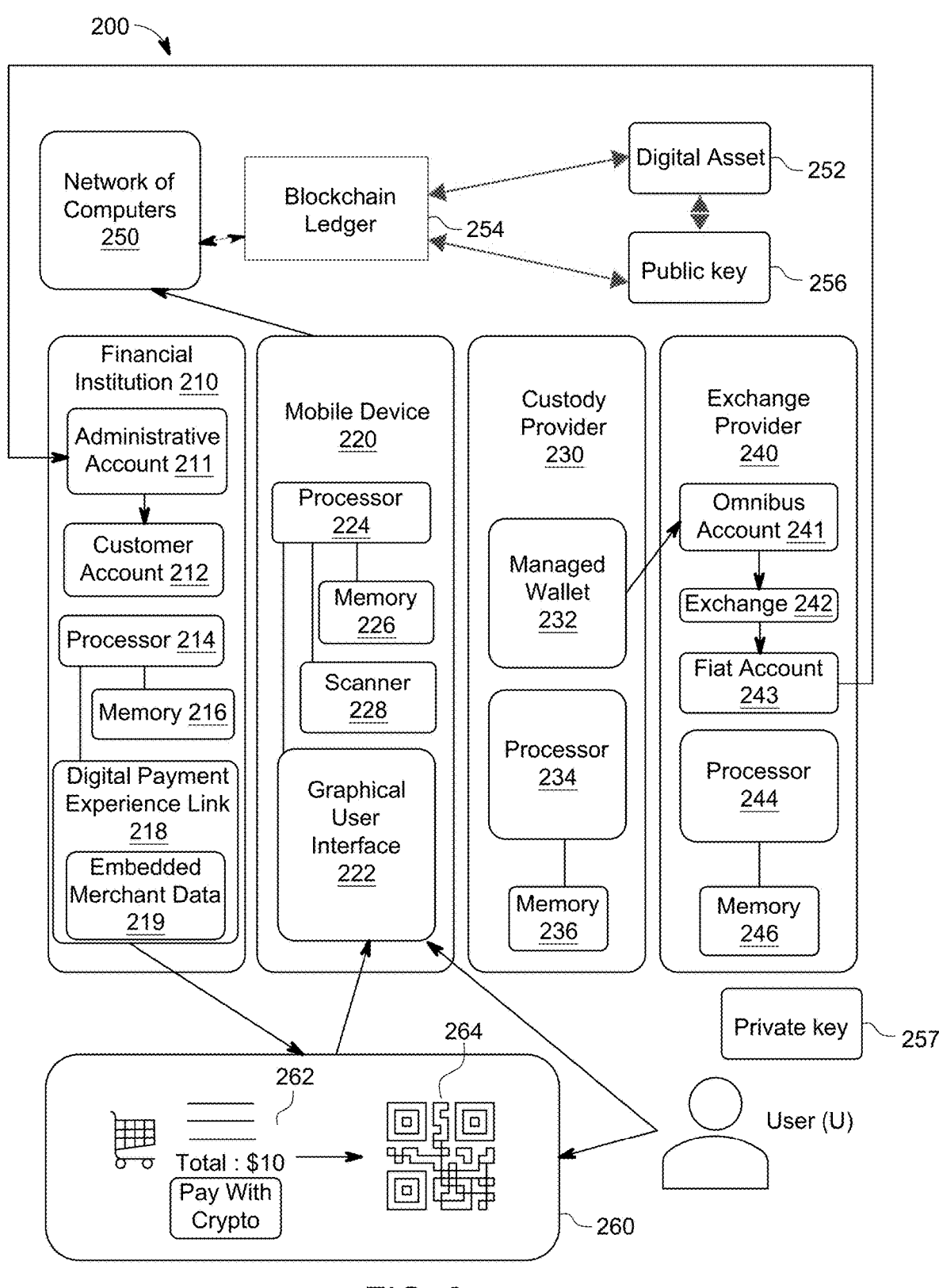
FIG. 2 is a block diagram depicting a digital asset payment rail system, according to various aspects of the present disclosure.

Referring now to FIG. 2, a digital asset payment rail system 200 is shown. The digital asset payment rail system 200 is for transferring digital assets from the wallet of a user 200 to a customer account 212. An exemplary digital asset 252 is depicted. A blockchain ledger 254 is associated the digital asset 252. The digital asset 252 is initially held in the user wallet and a private key 257 is associated user's wallet having the digital asset 252 stored therein. Generally, the user wallet may include a collection of private keys that corresponds to the various digital assets held by the user U. The user U is an end consumer, such as the consumer (e.g. a purchaser) of a customer (e.g. a goods/service provider, e-commerce vendor, or charitable/not-for-profit organization) of a financial institution (e.g. a bank). The user U uses their own wallet, which is not necessarily affiliated or influenced by the financial institution facilitating the digital asset payment rail system 200.

In various instances, the digital asset 252 is a cryptocurrency. In still other instances, the digital asset 252 is another type of digital asset, such as a stablecoin, asset-based token, and/or utility token based on blockchain technology, for example.

The reader will appreciate each digital asset is associated with a corresponding blockchain ledger 254. A network of computers 250 is also depicted. The reader will readily appreciate that each blockchain technology can be associated with a corresponding network of computers. For a public blockchain, the network of computers 250 is a peer-to-peer decentralized network of computers. For a private blockchain, the network of computers 250 can be a centralized network of computers.

The system 200 further comprises a financial institution 210 (e.g. a bank), a digital device 220 (e.g. a personal mobile device of the user U), a custody provider 230, and an exchange provider 240. In certain instances, the financial institution 210 can further comprise the custody provider 230 and/or the exchange provider 240. In instances in which the financial institution 210 is also the custody provider 230, the financial institution 210 would obtain custody of the digital asset, for example. Regulatory compliance may impact custody arrangements for digital assets along the digital asset payment rail.

The financial institution 210 manages the customer account 212. The customer account 212 is associated with a customer or client of the financial institution 210. An administrator at the customer can use a customer-facing portal to see balance information and/or investigate the transaction history for the customer account 212. The administrator can further request and/or set up new wallets and/or accounts at the financial institution 210 and/or other financial institutions.

In various instances, the financial institution 210 manages multiple customer accounts. For example, each customer of the financial institution can be associated with at least one customer account. The financial institution 210 further includes an administrative account 211 for administering and/or managing the various customer accounts. An administrator at the financial institution 210 on-boards and sets up customer accounts (e.g. customer account 212), manages customer requests and exceptions, and/or manages the administrative account 211, including transfers to fiat and/or digital assets, for example.

The financial institution 210 further comprises a processor 214, which can be remote to the financial institution 210, and a memory 216. The financial institution 210 provides the wallet address of the customer to the user U. The memory 216 stores instructions, e.g. software, such that the processor 214 is configured to generate a link 218 to a digital payment experience. The link 218 further includes embedded merchant data 219. For example, the embedded merchant data 219 for a respective link corresponds to and identifies the customer account 212 and the amount of currency (fiat or digital) owed and/or agreed upon for a particular transaction.

In various instances, the link 218 comprises a hyperlink to the digital payment experience or gateway to transfer funds to the wallet of the customer (e.g. wallet for the goods/service provider, e-commerce vendor, or charitable/not-for-profit organization). A customer's e-commerce platform (e.g. website) 260 can display and/or otherwise provide the link 218, for example. In various instances, the link 218 comprises a QR code. For example, the e-commerce platform 260 can depict an e-commerce checkout screen 262, and upon agreeing to pay with a digital asset (e.g. "Pay with Crypto"), the e-commerce platform 260 can generate a QR code 264, for example. The user U activates the link 218, such as by scanning the QR code 264 on the customer's e-commerce platform 260, to launch the digital payment experience and authorize the transfer to the customer's wallet.

The link 218 (e.g. QR code 264) can be displayed on a graphical user interface, such as the graphical user interface 228 of the user's digital device 220, as further explained herein. In other instances, the link 218 can be displayed on a separate graphical user interface, such as the graphical user interface of a separate mobile device, tablet, and/or computer, for example. The e-commerce platform 260 can provide access to the digital payment experience in other ways. For example, the platform 260 can display a link, which can allow the user U to copy the public key, or wallet address, of the customer's wallet and subsequently paste it into another program. Public keys are generally long, cryptic strings of characters that are difficult to remember and to manually enter. Nonetheless, in still other instances, the platform 260 can display the public key to the customer's wallet for the user U to manually copy and enter into another program and/or website. As another example, a user interface can be provided to facilitate selection of a blockchain protocol and the associated transaction steps. In various instances, a micro-app can be incorporated into a customer's website (e.g. an e-commerce website). During check-out, selection and activation of the micro-app can facilitate the transaction and, upon completion, can indicate to the user U whether the transaction was a success or a failure.

The digital device 220 can be a computer in any form factor (e.g. a desktop computer, a laptop computer, a mobile phone, a tablet, or any device with Internet of Things (IoT) payment capabilities built-in to the device. The user's digital device 220 includes a processor 224, a memory 246, and a display, such as a graphical user interface 222. The user U interacts with the graphical user interface 222. The memory 226 stores instructions, e.g. software, such that the processor 224 is configured to launch the digital payment experience via the graphical user interface 222 upon activation of the link 218 by the user U.

In various instances, the digital device 220 further includes a camera or scanner 228. The scanner 228 is operable to scan the QR code 264, for example, to launch the digital payment experience via a web browser on the digital device 220.

The digital payment experience comprises an interactive experience for the user U. The user U is configured to authorize a transfer of the digital asset via interaction with the digital payment experience. For example, the user U can scan the link 218 with the scanner 228 to launch the digital payment experience on the graphical user interface 222 of the digital device 220. The user U can authorize a transfer of the digital asset 252 from a consumer wallet associated with the user U to the customer account 212 identified by the embedded merchant data 219 in the digital payment experience link 218.

Gas fees are generally owed upon authorizing the transfer. The gas fees can be built into the cost of the transaction, for example. The user U may also assume the market volatility risks associated with the transfer.

The network of computers 250 is configured to update the blockchain ledger 254 associated with the digital asset 252 to reflect a transfer of the digital asset 252 to a managed wallet 232 based on authorization by the user U with the user's wallet address public key using the user's private key. The managed wallet 232 is hosted by the financial institution 210 in various instances. The transaction request is distributed to node operators within the network of computers and the node operators validate the transaction. Upon verification of the transaction, the transaction is combined with other transactions to form a block, and the blockchain ledger is updated with the new block.

The custody provider 230 holds the managed wallet 232. The custody provider also includes a processor 234, and a memory 236 storing instructions (e.g. software) configured to secure the private key 257 of the user's wallet U, which enables custody of the digital asset 252. Based on the custody provider 230 securing the private key 257, the custody provide 230 obtains custody of the digital asset 252. At the outset of the transaction, the user U has the private key 257 and, thus, the user can initiate the transfer of the digital asset 252 to the custody provider 230 using the private key 257 for the user's wallet to ask the consensus mechanism to validate the transfer of the digital asset 252 to the custody provider 230. Upon transfer of the digital asset 252 to the custody provider 230, the custody provider 230 has the private key to the managed wallet 232 storing the digital asset 252. The custody provider 230 also reads the blockchain ledger 254 and can displays the state of the user's wallet.

The custody provider 230 is further configured to evaluate the digital asset 252 and, based on the evaluation, characterize the digital asset 252 as compliant or non-compliant. A digital asset 252 is characterized as compliant based on the absence of suspicious blocks in the blockchain ledger 254 of the digital asset 252. A digital asset 252 is characterized as non-compliant based on the presence of at least one suspicious block in the blockchain ledger 254 of the digital asset 252. The compliance check can ensure the digital asset 252 has not been obtained by fraud and/or other criminal activity, for example.

In various instances, the custody provider 230 is a digital asset infrastructure provider engaged by the financial institution 210 to safely store and transfer digital assets using private keys. For example, the custody provider 230 can provide an infrastructure to break up a private key into key shares have a multi-party compute (MPC). Key shares can effectively split a private key across multiple entities so if one key share is compromised, the other key shares are required for the transaction. In other instances, the financial institution can implement key shares and an MPC infrastructure. For example, the system may not include a custody provider 230 separate from the financial institution and the financial institution may hold, control, or access the private key for the digital asset. In various instances, the custody provider (e.g. the financial institution or a separate custody provider) can implement a multisignature requirement, i.e. multisig. For example, a seed phrase can be split between two or more parties (e.g. the user U and the custody provider) and all parts of the seed phrase can be required to effect the transaction.

Compliant digital assets can be transferred to the exchange provider 240 for off-ramping to fiat and, ultimately, for transfer to the target customer account 211 at the financial institution 210. Non-compliant digital assets can be held or frozen by the exchange provider 240 for further review. In certain instances, regulations may mandate reporting of non-compliant digital assets to the authorities. Non-compliant digital assets can be frozen by the exchange provider 250 in an escrow account, for example. The digital asset can be held until the investigation is completed and the digital asset is clear, for example. In various instances, the exchange provider 250 notifies the user U that the transaction is undergoing further review and/or cannot be completed. In certain instances, the value of the non-compliant digital asset subject to the transaction can be refunded in fiat.

Fees paid to the network of computers 250 to incentivizes the consensus mechanism to operate the blockchain ledger are called "gas fees." Such "gas fees" are generally owed to the operators of the network of computers 250. In various instances, the "gas fees" are paid by the custody provider 230 upon authorizing the transfer to the exchange provider 240. The gas fees can be built into the cost of the transaction, for example. In still other instances, the gas fees are paid by the custody provider and reimbursed later. The custody provider 230 may also assume the market volatility risks associated with the transfer.

The exchange provider 240 manages several accounts. For example, the exchange provider can receive digital assets in an omnibus account 241, off-ramp the digital assets at an exchange 242, and hold the digital assets in a fiat account 243 prior to transfer to the financial institution 210. The exchange provider 240 further comprises a processor 244, which can be remote to the exchange provider 240, and a memory 2246. The memory 246 stores instructions, e.g. software, such that the processor 244 is configured to off-ramp the digital asset 252 to a fiat currency and transfer the fiat currency to the fiat account 243 and ultimately to the financial institution 210. Exchange fees may be due for the off-ramping of the digital asset 252 to fiat, for example.

The transfer of a digital asset via the digital asset payment rail system 200 is efficient. The digital asset 252 can be transferred from the user's wallet to the custody provider 230 within a few hours. In various instances, the transfer can take between 10 minutes and 120 minutes, for example. In other instances, the transfer can occur in less than 10 minutes, for example. Thereafter, the compliance screening can be initiated. For example, upon receipt of the digital asset in the managed wallet 232, the compliance screen can be initiated. The compliance screening can be quick, e.g. less than one hour. In various instances, the compliance screening can take 15-25 minutes, for example, and, in still other instances, less than 15 minutes, for example. The duration of a compliance screening depends on the people and processes in the financial institution's 210 compliance scheme, for example. If an alert is triggered by the compliance screening, the alert can be provided in a timely manner to the user U and/or the customer. Batch transfers from the custody provider 230 to the exchange provider 240 can optimize the efficiency of the digital asset payment rail system 200. A batch transfer can be implemented at regular intervals (e.g.

10-minute intervals, 30-minute intervals, 1-hour intervals, 2-hour intervals, 4-hour intervals, etc.) and/or at preset times each day.

Off-ramping of the digital asset can take a few minutes and can be nearly instantaneous (e.g. less than one minute) in various instances. Transferring of fiat currency from the exchange provider 240 to the financial institution 210 can take a few minutes and less than one minute in various instances. A batch transfer can be implemented at regular intervals (e.g. 10-minute intervals, 30-minute intervals, 1-hour intervals, 2-hour intervals, 4-hour intervals, etc.) and/or at preset times each day. In various instances, the batch transfer to the financial institution 210 can occur once a day at the end of the day, for example. A direct deposit into the customer account 212 from the administrative account 211 can take a few minutes and can be nearly instantaneous (e.g. less than one minute) in various instances. In various instances, the transfer to the customer account 212 can be wired, sent by real-time payments (RTP), or ACH, for example.

The reader will appreciate that the system 200 can be utilized for multiple transactions and by multiple users. The system 200 can further include multiple digital devices 220. For example, each user U can authorize one or more transactions on their personal mobile devices 220.

Two or more of the transactions can occur, at least in part, concurrently. For example, various transactions can overlap in time. In various instances, a series of transactions can be initiated sequentially. For example, a first user can initiated a first transaction, then a second user can initiate a second transaction.

In such instances, batch exchanges and/or transfers can be implemented by the custody provider 230, exchange provider 240, and/or the financial institution 210. For example, the custody provider 230 comprises the managed wallet 232 that corresponds to the financial institution 210 and holds (temporarily) funds corresponding to multiple accounts at the financial institution 210. In certain instances, a batch exchange and/or transfer can improve the efficiency of the digital asset payment rail system 200. In various instances, each transfer can be tracked and tagged for tax accounting purposes and/or for ensuring the appropriate amount of fiat currency is ultimately deposited in each customers' accounts.

In various instances, the digital asset payment rail system 200 further includes a tax accounting platform, which is configured to track the tax lot events for the digital assets transferred by the digital asset payment rail system 200. A tax lot event is a taxable event, i.e. an event triggering a tax consequence. For example, transferring an asset can trigger a tax consequence at the time control of the asset is transferred. Depending on the digital asset and legal and/or compliance treatment thereof, the transfer of a digital asset can be considered to be a security or commodity sale. If the value of the asset can fluctuate, the owner may be taxed for capital gain, for example, or record a tax-impacting loss, for example. For digital assets (e.g. digital asset 252), the taxable event occurs when the node operators reach a consensus that the originator has the right to request the update entry to the blockchain ledger (e.g. blockchain ledger 254), thus updating the blockchain ledger for the digital asset. Tax lot events can be recorded upon updating the blockchain ledger for each digital asset transferred by the digital asset payment rail system 200. The tax lot events can also be recorded upon transferring the fiat currency from the fiat account. In instances in which the transaction is not completed because the digital asset is non-compliant, a tax lot event can still be recorded upon transfer of the digital asset to the custody provider 230. In such instances, gas fees may still be charged by the node operators and, thus, the financial institution 210 instituting the transfer and/or the custody provider 230 may be responsible for the gas fees and/or the tax consequences associated with the transfer.

Referring now to FIG. 3 a method 400 for transferring digital assets is depicted. The method 400 can be implemented by the digital asset payment rail systems disclosed herein, such as the system 200, for example.

At block 402, a link to a digital payment experience is provided. For example, the financial institution 210 can provide the link. A digital payment experience is launched at block 404. A user (e.g. user U) can activate the link, such as by scanning a QR code with a camera or scanner on the user's personal mobile device, for example, the launch the digital payment experience. The digital payment experience comprises a graphical user interface. At block 406, the user authorizes a transfer of a digital asset from the user's wallet to an account identified by merchant data embedded in the link provided by the financial institution. The user authorizes the transfer by interacting with the graphical user interface, such as the graphical user interface on the user's mobile device.

At block 408, the blockchain ledger for the digital asset is updated to reflect the transfer and, at block 410, the blockchain ledger is evaluated for suspicious blocks. For example, the custody provider 230 can evaluate the digital asset for suspicious blocks and characterize the digital asset as compliant (proceeding to block 412) or non-compliant (proceeding to block 422) based on the evaluation.

The digital asset is characterized as compliant at block 412 if the blockchain ledger is free of suspicious blocks. For compliant digital assets, the digital asset is exchanged for fiat currency at block 414 and subsequently deposited in the account identified by the embedded merchant data at block 416.

The digital asset is characterized as non-compliant at block 422 if the blockchain ledger includes at least one suspicious block. For non-compliant digital assets, the digital asset is held (at least temporarily) in the managed wallet of the custody provider. Certain authorities may be notified if a digital asset is characterized as non-compliant. Moreover, the user and the customer can be notified that the digital asset is being held. In various instances, the digital asset can be refunded to the user as fiat currency.

In various instances, the method can further include tax lot accounting and/or reporting. For example, the financial institution can manage the tax lot events and generate a tax lot statement for its customer's.

Referring now to FIG. 4, a tax lot accounting process 430 for compliant digital assets is shown. At block 432, a transaction comprising a transfer of a compliant digital asset is effected by the user U. For example, the user can authorize and initiate the transfer via an interactive graphical user interface via a digital payment experience on a web portal. At block 434, a first tax lot event is tracked based on updating the blockchain ledger for the compliant digital asset. At block 436, a second tax lot event is tracked based on depositing fiat currency in exchange for the compliant digital asset. Tracking the tax lot events can include recording the underlying details of the transactions, including the date and time, as well as the value of the compliant digital asset. Thereafter, a tax lot statement can be issued at block 438, which includes the first tax lot event and the second tax lot event. In various instances, the tax lot event can include additional tax lot events. The tax lot statement can be issued by the financial institution hosting the managed wallet at the custody provider (e.g. the financial institution 210).

Referring now to FIG. 5, a tax lot accounting process 440 for non-compliant digital assets is shown. At block 442, a transaction comprising a transfer of a non-compliant digital asset is effected by the user. For example, the user can authorize and initiate the transfer via an interactive graphical user interface via a digital payment experience on a web portal. At block 444, a tax lot event is tracked based on updating the blockchain ledger for the non-compliant digital asset. Tracking the tax lot event can include recording the underlying details of the transaction, including the date and time, as well as the value of the compliant digital asset. Thereafter, a tax lot statement can be issued at block 446, which includes the tax lot event. In various instances, the tax lot event can include additional tax lot events. The tax lot statement can be issued by the financial institution hosting the managed wallet at the custody provider (e.g. the financial institution 210).

The processors disclosed herein (e.g. processors 214, 224, 234, 244) are electronic devices capable of executing instructions encoding arithmetic, logical, and/or I/O operations. The processors may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

The memory disclosed herein (e.g. memory 216, 226, 236, 246) may be volatile or non-volatile memory devices, such as RAM, ROM, EEPROM, or any other device capable of storing data. The memory may be persistent storage devices such as hard drive disks ("HDD"), solid-state drives ("SSD"), and/or persistent memory (e.g., Non-Volatile Dual In-line Memory Module ("NVDIMM")).

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

In one general aspect, a method of transferring digital assets comprising effecting a first transaction and effecting a second transaction. Effecting the first transaction may include providing, by a financial institution, a first link to a first digital payment experience, where the first link may include a plurality of embedded first merchant data, and where the plurality of embedded first merchant data identifies one of a plurality of accounts at the financial institution; upon accessing the first link, launching the first digital payment experience, where the first digital payment experience may include a first graphical user interface; authorizing, via interaction with the first graphical user interface, a first transfer of a first digital asset from a first consumer wallet to the account identified by the plurality of embedded first merchant data; and, upon authorization of the first transfer, updating, by a network of computers, the blockchain ledger of the first digital asset to reflect the first transfer, where the first transfer may include transferring the first digital asset to a managed wallet of a custody provider, and where the custody provider secures a private key to the first digital asset; based on the absence of suspicious blocks in the blockchain ledger of the first digital asset, characterizing the first digital asset as compliant; and upon characterizing the first digital asset as compliant, exchanging the first digital asset for a fiat currency and depositing the fiat currency in the account identified by the plurality of embedded first merchant data. Effecting the second transaction may include providing, by the financial institution, a second link to a second digital payment experience, where the second link may include a plurality of embedded second merchant data, and where the plurality of embedded second merchant data identifies one of the plurality of accounts at the financial institution; upon accessing the second link, launching the second digital payment experience, where the second digital payment experience may include a second graphical user interface; authorizing, via interaction with the second graphical user interface, a second transfer of a second digital asset from a second consumer wallet to the account identified by the plurality of embedded second merchant data; upon authorization of the second transfer, updating, by a network of computers, the blockchain ledger of the second digital asset to reflect the second transfer, where the second transfer may include transferring the second digital asset to the managed wallet of the custody provider, where the custody provider secures a private key to the second digital asset; based on the presence of at least one suspicious block in the blockchain ledger of the second digital asset, characterizing the second digital asset as non-compliant; and upon characterizing the second digital asset as non-compliant, holding the second digital asset in the managed wallet of the custody provider. Other embodiments of this aspect include corresponding computer systems, apparatus, and computer programs recorded on one or more computer storage devices, each configured to perform the actions of the foregoing methods.

Implementations may further include one or more of the following features. The method further may include tracking, by the financial institution, a plurality of tax lot events associated with the first transaction and the second transaction. The plurality of tax lot events associated with the first transaction may include: a first tax lot event may include updating the blockchain ledger of the first digital asset to reflect the first transfer; and a second tax lot event may include depositing the fiat currency in the account identified by the plurality of embedded first merchant data. The plurality of tax lot events associated with the second transaction may include a third tax lot event may include updating the blockchain ledger of the second digital asset to reflect the second transfer. The first tax lot statement may include the first tax lot event and the second tax lot event; and issuing, by the financial institution, a second tax lot statement, where the second tax lot statement may include the third tax lot event and the fourth tax lot event. The managed wallet at the custody provider encompasses a plurality of accounts at the financial institution, and where the method further may include: updating the blockchain ledger of the plurality of digital assets to reflect transfer to a managed wallet of a custody provider, where each account of the plurality of accounts is tagged to receive at least one digital asset; based on the absence of suspicious blocks in the blockchain ledgers of the plurality of digital assets, characterizing the plurality of digital assets as compliant; and upon characterizing the plurality of digital assets as compliant, exchanging, as a batch, the plurality of digital assets for the fiat currency and depositing the fiat currency corresponding to each digital asset in the account of the plurality of accounts at the financial institution tagged to receive the respective digital asset. The method may include tracking, by the financial institution, tax lot events for each digital asset of the plurality of digital assets. The method may include effecting the first transaction and the second transaction at least in part concurrently. The method may include initiating the first transaction and the second transaction sequentially. Effecting the first transaction further may include a first consumer authorizing the first transfer, and where effecting the second transaction further may include a second consumer authorizing the second transfer. The account identified by the plurality of embedded first merchant data is the same as the account identified by the plurality of embedded second merchant data. Providing the first link to the first digital payment experience may include displaying a digital code on the first graphical user interface. The digital code may include a QR code, and where the method further may include scanning the QR code with a scanner on a mobile device. The digital code further may include an embedded payment amount, and where the digital asset is equivalent to the embedded payment amount at the time the first transfer is authorized. The second transaction may include updating the blockchain ledger of the second digital asset to reflect a third transfer, where the third transfer may include returning the second digital asset to the second consumer wallet. Implementations of the described techniques may include hardware, a method or process, or computer software on a computer-accessible medium.

In another general aspect, a digital asset payment rail system is for transferring digital assets. The digital asset payment rail system may include a financial institution that may include a plurality of accounts, a first remote processor, and a memory storing instructions such that the first remote processor, through software stored in the memory, is configured to provide a link to a digital payment experience, where the link may include a plurality of embedded merchant data, and where the plurality of embedded merchant data of the link identifies one of the plurality of accounts. The system may also include a mobile device that may include a graphical user interface, a mobile processor, and a memory storing instructions such that the mobile processor, through software stored in the memory, is configured to: upon activation of the link, launch the digital payment experience on the graphical user interface; and receive authorization from a user of the mobile device via interaction with the graphical user interface to effect transfer of a digital asset from a consumer wallet associated with the user to the account identified by the plurality of embedded merchant data. The system may also include a network of computers configured to update the blockchain ledger of the digital asset to reflect transfer of the digital asset to a managed wallet based on authorization by the user. The system may also include a custody provider that may include the managed wallet, a second remote processor, and a memory storing instructions such that the second remote processor, through software stored in the memory, is configured to: secure a private key of the digital asset based on the custody provider obtaining custody of the digital asset; and characterize the digital asset as compliant based on the absence of suspicious blocks in the blockchain ledger of the digital asset. The system may also include an exchange provider that may include a third remote processor and a memory storing instructions such that the third remote processor, through software stored in the memory, is configured to, off-ramp the digital asset to a fiat currency and transfer the fiat currency to the account identified by the plurality of embedded merchant data based on the digital asset being characterized as compliant. Other embodiments of this aspect include corresponding computer systems, apparatus, and computer programs recorded on one or more computer storage devices, each configured to perform the actions of the methods.

Implementations may include one or more of the following features. The digital asset payment rail system where the network of computers may include a network of peer-to-peer decentralized computers. The digital asset may include a first digital asset, where the first remote processor, through software stored in the memory, is further configured to provide a second link to a second digital payment experience, where the second link may include a second plurality of embedded merchant data, and where the second plurality of embedded merchant data of the link identifies one of the plurality of accounts; where the system further may include a second mobile device may include a second graphical user interface, a second mobile processor, and a second memory storing instructions such that the second mobile processor, through software stored in the second memory, is configured to: upon activation of the second link, launch a second digital payment experience on the second graphical user interface; and receive authorization from a user of the second mobile device via interaction with the second graphical user interface to effect transfer of a second digital asset from a consumer wallet associated with the user of the second mobile device to the account identified by the second plurality of embedded merchant data; where the network of computers is further configured to update the blockchain ledger of the second digital asset to reflect transfer of the second digital asset from the consumer wallet to the managed wallet based on authorization by the user of the second mobile device; and where the second remote processor, through software stored in the memory, is further configured to: secure a private key of the second digital asset based on the custody provider obtaining custody of the second digital asset; characterize the second digital asset as non-compliant based on the presence of at least one suspicious block in the blockchain ledger of the second digital asset; and hold the second digital asset in the managed wallet based on the characterization of the second digital asset as non-compliant. The link may include a QR code, where the mobile device further may include scanner, and where the scanner is operable to scan the QR code to launch the digital payment experience via a web browser on the mobile device. The digital asset may include cryptocurrency. The first remote processor, through software stored in the memory, is configured to track a plurality of tax lot events for the digital asset, where the plurality of tax lot events for the digital asset may include: a first event corresponding to updating the blockchain ledger of the digital asset; and a second event corresponding to the transfer of the fiat currency to the account identified by the plurality of embedded merchant data. Implementations of the described techniques may include hardware, a method or process, or computer software on a computer-accessible medium.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some further descriptions of terms used herein are provided below.

The terms "digital device" and "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system. A client or user device may also include an access device as defined in this application.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices may constitute a "system".

Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

A "server computer" may typically be a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "user" may include an individual. In some embodiments or aspects, a user may be associated with one or more personal accounts and/or mobile devices. The user may also refer to a "user data object" associated with a user, or a data object that signifies or identifies a user, where the user object can comprise 'user information' or data associated with the user, for example the phrase "adding a user to a group" can signify adding the user data object or data associated to it, including and not limited to user information, metadata, identifiers, tokens or other data related to a user or user data object.

Likewise a "group" can indicate grouping users under a data object or file, or of a data object that signifies a group. The data object related to the group includes and is not limited to information, metadata, identifiers, tokens or other data related to a group or group data object Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method of transferring digital assets, wherein a blockchain ledger is associated with each digital asset, and wherein the method comprises:

effecting, by execution of instructions on a programmed processor of a financial institution, a first transaction, comprising:

providing, by the financial institution, a first machine-readable link to a first digital payment experience, wherein the first machine-readable link comprises a plurality of embedded first merchant data in a machine-readable format that, when accessed by a client device, causes execution of instructions to launch the first digital payment experience, and wherein the plurality of embedded first merchant data identifies one of a plurality of accounts at the financial institution;

upon accessing the first machine-readable link, launching, by a first client device, the first digital payment experience, wherein the first digital payment experience comprises a first graphical user interface;

authorizing, via interaction with the first graphical user interface, a first transfer of a first digital asset from a first consumer wallet to the account identified by the plurality of embedded first merchant data;

upon authorization of the first transfer, causing, by the financial institution, the blockchain ledger of the first digital asset to be updated by a network of peer-to-peer decentralized computers to reflect the first transfer, wherein the first transfer comprises transferring the first digital asset to a managed wallet of a custody provider, and wherein the custody provider secures a private key to the first digital asset within a secure storage of the custody provider implemented by a processor and memory of the custody provider;

based on the absence of suspicious blocks in the blockchain ledger of the first digital asset, characterizing the first digital asset as compliant by executing, by the processor of the custody provider, an evaluation algorithm to identify any suspicious blocks; and upon characterizing the first digital asset as compliant, exchanging the first digital asset for a fiat currency and depositing the fiat currency in the account identified by the plurality of embedded first merchant data; and effecting, by execution of instructions on the programmed processor, a second transaction, comprising:

providing, by the financial institution, a second machine-readable link to a second digital payment experience, wherein the second machine-readable link comprises a plurality of embedded second merchant data in a machine-readable format that, when accessed by a client device, causes execution of instructions to launch the second digital payment experience, and wherein the plurality of embedded second merchant data identifies one of the plurality of accounts at the financial institution;

upon accessing the second machine-readable link, launching, by a second client device, the second digital payment experience, wherein the second digital payment experience comprises a second graphical user interface;

authorizing, via interaction with the second graphical user interface, a second transfer of a second digital asset from a second consumer wallet to the account identified by the plurality of embedded second merchant data;

upon authorization of the second transfer, causing, by the financial institution, the blockchain ledger of the second digital asset to be updated by the network of peer-to-peer decentralized computers to reflect the second transfer, wherein the second transfer comprises transferring the second digital asset to the managed wallet of the custody provider, wherein the custody provider secures a private key to the second digital asset within the secure storage of the custody provider implemented by the processor and memory of the custody provider;

based on the presence of at least one suspicious block in the blockchain ledger of the second digital asset, characterizing the second digital asset as non-compliant by executing the evaluation algorithm; and upon characterizing the second digital asset as non-compliant, holding the second digital asset in the managed wallet of the custody provider.

2. The method of claim 1, further comprising tracking, by the financial institution, a plurality of tax lot events associated with the first transaction and the second transaction.

3. The method of claim 2, wherein the plurality of tax lot events associated with the first transaction comprise:

a first tax lot event comprising updating the blockchain ledger of the first digital asset to reflect the first transfer; and a second tax lot event comprising depositing the fiat currency in the account identified by the plurality of embedded first merchant data.

4. The method of claim 3, wherein the plurality of tax lot events associated with the second transaction comprise a third tax lot event comprising updating the blockchain ledger of the second digital asset to reflect the second transfer.

5. The method of claim 4, further comprising:

issuing, by the financial institution, a first tax lot statement, wherein the first tax lot statement comprises the first tax lot event and the second tax lot event; and issuing, by the financial institution, a second tax lot statement, wherein the second tax lot statement comprises the third tax lot event and the fourth tax lot event.

6. The method of claim 1, wherein the managed wallet at the custody provider encompasses a plurality of accounts at the financial institution, and wherein the method further comprises:

updating the blockchain ledger of the plurality of digital assets to reflect transfer to a managed wallet of a custody provider, wherein each account of the plurality of accounts is tagged to receive at least one digital asset;

based on the absence of suspicious blocks in the blockchain ledgers of the plurality of digital assets, characterizing the plurality of digital assets as compliant; and upon characterizing the plurality of digital assets as compliant, exchanging, as a batch, the plurality of digital assets for the fiat currency and depositing the fiat currency corresponding to each digital asset in the account of the plurality of accounts at the financial institution tagged to receive the respective digital asset.

7. The method of claim 6, further comprising tracking, by the financial institution, tax lot events for each digital asset of the plurality of digital assets.

8. The method of claim 1, further comprising effecting the first transaction and the second transaction at least in part concurrently.

9. The method of claim 1, further comprising initiating the first transaction and the second transaction sequentially.

10. The method of claim 1, wherein effecting the first transaction further comprises a first consumer authorizing the first transfer, and wherein effecting the second transaction further comprises a second consumer authorizing the second transfer.

11. The method of claim 1, wherein the account identified by the plurality of embedded first merchant data is the same as the account identified by the plurality of embedded second merchant data.

12. The method of claim 1, wherein providing the first machine-readable link to the first digital payment experience comprises displaying a digital code on the first graphical user interface.

13. The method of claim 12, wherein the digital code comprises a QR code, and wherein the method further comprises scanning the QR code with a scanner on a mobile device.

14. The method of claim 13, wherein the digital code further comprises an embedded payment amount, and wherein the digital asset is equivalent to the embedded payment amount at the time the first transfer is authorized.

15. The method of claim 1, wherein the second transaction further comprising updating the blockchain ledger of the second digital asset to reflect a third transfer, wherein the third transfer comprises returning the second digital asset to the second consumer wallet.

16. A digital asset payment rail system for transferring digital assets, wherein a blockchain ledger is associated with each digital asset, the system comprising:

a financial institution comprising a plurality of accounts, a first remote processor, and a memory storing instructions such that the first remote processor, through software stored in the memory, is configured to provide a first machine-readable link to a digital payment experience, wherein the first machine-readable link comprises a plurality of embedded merchant data in a machine-readable format that, when accessed by a client device, causes execution of instructions to launch the digital payment experience, and wherein the plurality of embedded merchant data of the first machine-readable link identifies one of the plurality of accounts;

a mobile device comprising a graphical user interface, a mobile processor, and a memory storing instructions such that the mobile processor, through software stored in the memory, is configured to:

upon activation of the first machine-readable link, launch the digital payment experience on the graphical user interface; and receive authorization from a user of the mobile device via interaction with the graphical user interface to effect transfer of a digital asset from a consumer wallet associated with the user to the account identified by the plurality of embedded merchant data;

the financial institution configured to update the blockchain ledger of the digital asset by a network of peer-to-peer decentralized computers to reflect transfer of the digital asset to a managed wallet based on authorization by the user;

a custody provider comprising the managed wallet, a second remote processor, and a memory storing instructions such that the second remote processor, through software stored in the memory, is configured to:

secure a private key of the digital asset within a secure storage of the custody provider implemented by a processor and a memory of the custody provider based on the custody provider obtaining custody of the digital asset;

execute an evaluation algorithm to identify any suspicious blocks in the block chain ledger of the digital asset; and characterize the digital asset as compliant based on the absence of suspicious blocks in the blockchain ledger of the digital asset; and an exchange provider comprising a third remote processor and a memory storing instructions such that the third remote processor, through software stored in the memory, is configured to, off-ramp the digital asset to a fiat currency and transfer the fiat currency to the account identified by the plurality of embedded merchant data based on the digital asset being characterized as compliant.

17. The digital asset payment rail system of claim 16, wherein the digital asset comprises a first digital asset, wherein the first remote processor, through software stored in the memory, is further configured to provide a second machine-readable link to a second digital payment experience, wherein the second machine-readable link comprises a second plurality of embedded merchant data, and wherein the second plurality of embedded merchant data of the second machine-readable link identifies one of the plurality of accounts;

wherein the system further comprises a second mobile device comprising a second graphical user interface, a second mobile processor, and a second memory storing instructions such that the second mobile processor, through software stored in the second memory, is configured to:

upon activation of the second machine-readable link, launch a second digital payment experience on the second graphical user interface; and receive authorization from a user of the second mobile device via interaction with the second graphical user interface to effect transfer of a second digital asset from a consumer wallet associated with the user of the second mobile device to the account identified by the second plurality of embedded merchant data;

wherein the network of computers is further configured to update the blockchain ledger of the second digital asset to reflect transfer of the second digital asset from the consumer wallet to the managed wallet based on authorization by the user of the second mobile device; and wherein the second remote processor, through software stored in the memory, is further configured to:

secure a private key of the second digital asset based on the custody provider obtaining custody of the second digital asset;

characterize the second digital asset as non-compliant based on the presence of at least one suspicious block in the blockchain ledger of the second digital asset; and hold the second digital asset in the managed wallet based on the characterization of the second digital asset as non-compliant.

18. The digital asset payment rail system of claim 16, wherein the first machine readable link comprises a QR code, wherein the mobile device further comprises scanner, and wherein the scanner is operable to scan the QR code to launch the digital payment experience via a web browser on the mobile device.

19. The digital asset payment rail system of claim 16, wherein the digital asset comprises cryptocurrency.

20. The digital asset payment rail system of claim 16, wherein the first remote processor, through software stored in the memory, is configured to track a plurality of tax lot events for the digital asset, wherein the plurality of tax lot events for the digital asset comprises:

a first event corresponding to updating the blockchain ledger of the digital asset; and a second event corresponding to the transfer of the fiat currency to the account identified by the plurality of embedded merchant data.

* * * * *